United States Patent
Canfield et al.

(10) Patent No.: US 8,704,671 B2
(45) Date of Patent: Apr. 22, 2014

(54) SELF-STICK RESONANT ENCLOSURE THAT RESPONDS TO FLUSH TOILET FILL VALVE WATER INFLOW VIBRATION

(71) Applicant: nth Solutions, LLC, Exton, PA (US)

(72) Inventors: Eric L. Canfield, Chester Springs, PA (US); Edward P. Cheslock, Delta, PA (US)

(73) Assignee: NTH Solutions, LLC, Exton, PA (US)

( * ) Notice: Subject to any disclaimer, the term of this patent is extended or adjusted under 35 U.S.C. 154(b) by 0 days.

(21) Appl. No.: 13/738,158

(22) Filed: Jan. 10, 2013

(65) Prior Publication Data

US 2013/0125625 A1    May 23, 2013

Related U.S. Application Data

(63) Continuation of application No. 12/748,853, filed on Mar. 29, 2010, now Pat. No. 8,362,907.

(60) Provisional application No. 61/164,191, filed on Mar. 27, 2009.

(51) Int. Cl.
  *G08B 21/00*  (2006.01)
  *E03D 11/02*  (2006.01)

(52) U.S. Cl.
  USPC .............................................. 340/605; 4/427

(58) Field of Classification Search
  USPC .......... 340/603, 605, 606, 611; 4/427; 73/290
  See application file for complete search history.

(56) References Cited

U.S. PATENT DOCUMENTS

| | | | |
|---|---|---|---|
| 3,891,870 A * | 6/1975 | Corbett | 310/338 |
| 3,930,556 A | 1/1976 | Kusuda et al. | |
| 4,006,371 A * | 2/1977 | Quirke | 310/322 |
| 4,079,213 A | 3/1978 | Bage et al. | |
| 4,155,066 A * | 5/1979 | Galvin et al. | 367/140 |
| 4,246,776 A * | 1/1981 | Thompson | 73/40.5 A |
| 4,289,019 A | 9/1981 | Claytor | |
| 4,413,198 A * | 11/1983 | Bost | 310/324 |
| 4,455,863 A | 6/1984 | Huebler et al. | |
| 4,543,817 A | 10/1985 | Sugiyama | |

(Continued)

FOREIGN PATENT DOCUMENTS

GB    2046554 A    11/1980

OTHER PUBLICATIONS

Schrock, Karen, "Fact or Fiction?: An Opera Singer's Piercing Voice Can Shatter Glass", Scientific American, pp. 1-2, http://www.scientificamerican.com/article.cfm?id=fact-or-fiction-opera-singer-can-shatter-glass (2007).

(Continued)

*Primary Examiner* — Benjamin C Lee
*Assistant Examiner* — Sigmund Tang
(74) *Attorney, Agent, or Firm* — Nixon & Vanderhye P.C.

(57) ABSTRACT

An electromechanical toilet leak detector comprises first and second enclosure portions. An adhesive structure disposed on the second enclosure portion, the adhesive structure in use for being removably adhered to the porcelain outer surface of a flush toilet. One of the first and second enclosure portions includes a groove that mates with a lip provided by the other of the first and second enclosure portions to provide a substantially water-resistant seal therebetween. A vibration sensing transducer disposed between the first and second enclosure portions generates a signal responsive to vibration generated by the toilet due to water inflow turbulence.

11 Claims, 16 Drawing Sheets

(56) References Cited

U.S. PATENT DOCUMENTS

| | | | |
|---|---|---|---|
| 4,850,223 | A | 7/1989 | Carlin et al. |
| 4,858,462 | A | 8/1989 | Coulter et al. |
| 4,911,012 | A | 3/1990 | Ziska |
| 4,978,880 | A * | 12/1990 | Causse et al. ............... 310/324 |
| RE33,977 | E | 6/1992 | Goodman et al. |
| 5,117,676 | A | 6/1992 | Chang |
| 5,134,876 | A | 8/1992 | Robertson et al. |
| 5,231,866 | A | 8/1993 | Peacock |
| 5,416,724 | A | 5/1995 | Savic |
| 5,533,383 | A | 7/1996 | Greene et al. |
| 5,675,506 | A | 10/1997 | Savic |
| 5,703,569 | A | 12/1997 | Oliver et al. |
| 6,877,170 | B1 | 4/2005 | Quintana et al. |
| 6,934,977 | B1 | 8/2005 | Quintana et al. |
| 6,937,155 | B2 | 8/2005 | Ballard |
| 6,983,130 | B2 * | 1/2006 | Chien et al. ............... 455/90.3 |
| 7,024,816 | B1 * | 4/2006 | Marks et al. ............... 47/39 |
| 7,396,000 | B2 | 7/2008 | Parsons et al. |
| 7,636,959 | B2 * | 12/2009 | Bowcutt et al. ............... 4/427 |
| 7,639,959 | B2 * | 12/2009 | Hirayama ............... 399/49 |
| 7,650,652 | B2 | 1/2010 | Schuster et al. |
| 7,673,511 | B2 * | 3/2010 | Yamamoto ............... 73/504.16 |
| 7,739,909 | B2 * | 6/2010 | Heise et al. ............... 73/290 V |
| 2004/0199989 | A1 | 10/2004 | Trolio |
| 2005/0133754 | A1 | 6/2005 | Parsons et al. |
| 2006/0168716 | A1 | 8/2006 | Schuster et al. |
| 2006/0168717 | A1 | 8/2006 | Schuster et al. |
| 2007/0235087 | A1 * | 10/2007 | Brent Gilbertson et al. . 137/460 |
| 2009/0270691 | A1 | 10/2009 | Arizaga Ballesteros |

OTHER PUBLICATIONS

Mehrania, David et al., "Iflamenko http://www.youtube.com/watch?v=17tqXgvCN0E", Physics & Astronomy at the University of Southern California (2006).

* cited by examiner

Example Installation

Example Detection Mode

Prior Art Example Toilet

Example Toilet Intended Flush Operation -
Handle Pressed to Initiate Flush

Example Toilet Intended Flush Operation - Flapper Open

Example Toilet Bowl Evacuation

Example Toilet Refilling After Intended Flush Operation - Fill Valve Open

Example Flapper Leak

Example Flapper Leak

Example Toilet Refilling Due to Unintended Fill Valve Action - Fill Valve Open

SELF-STICK RESONANT ENCLOSURE THAT RESPONDS TO FLUSH TOILET FILL VALVE WATER INFLOW VIBRATION

CROSS-REFERENCES TO RELATED APPLICATIONS

This application is a continuation of U.S. patent application Ser. No. 12/748,853 filed Mar. 29, 2010, and claims the benefit of U.S. Provisional Application No. 61/164,191 filed Mar. 27, 2009, entitled "Apparatus and Methods for Detecting Leaks and Preventing or Reducing Waste of Water", incorporated herein by reference. U.S. patent application Ser. No. 12/748,853 is related to co-pending commonly-assigned U.S. patent application Ser. No. 12/748,793 entitled "Detecting Unintended Flush Toilet Water Flow" filed Mar. 29, 2010, also incorporated herein by reference.

STATEMENT REGARDING FEDERALLY SPONSORED RESEARCH OR DEVELOPMENT

N/A

FIELD

The technology herein relates to a self-stick resonant enclosure that detects vibration produced by flush toilet fill valve water flow.

BACKGROUND AND SUMMARY

As water conservation continues to grow as a national and global concern, it is becoming abundantly clear that reduction in water usage and eliminating waste is an important national and global objective. Although the US population is increasing daily, the aquifers that supply potable water do not necessarily replenish according to demand. In some cases, up to 20% of the nation's population may experience moderate to extreme drought conditions at any point time. It is possible that many more will routinely experience significant drought levels in the future. Added to the population growth and limited replenishing of the aquifers, water utility infrastructures are already being stressed beyond their designed capacity while private wells often can run dry.

Toilets leaks that waste precious water have plagued us for years. While modern toilets are generally very reliable, they can and do malfunction from time to time. Perhaps the most common malfunction is when the so-called "flapper" (the rubber or other "flap" that controls the exit of water from the tank into the bowl) remains open, leaks or is misaligned. A stuck-open flapper can waste a lot of water. Sometimes the fix is as simple as jiggling the flush handle. Other times, it is necessary to replace the flapper.

Although often difficult to see and identify, a leaking flapper can sometimes be detected by observing a slight flow of water from the rim holes into the toilet bowl. It is also sometimes possible to detect the flapper's failure to close by listening for water running or trickling continuously into the tank, or for the periodic activation of the fill valve. People who are hearing-impaired may not be able to hear the water running. More modern toilets are often so quiet in their operation that a leak is audibly undetectable. Reasons that account for so many leaking toilet flappers thus include people not hearing the toilet "run" or failing to visually observe the water flowing from the bowl rim holes into the bowl. Even when these conditions are observed, the observer does not always conclude that there is a problem, or that water is even being wasted. There are many people who have paid high water bills for years, believing the bills to be normal.

Leaking toilet flappers are not an isolated problem. In fact, without routine maintenance, it isn't a question of "if" a toilet is going to leak, but "when". There are over 250 million toilets in the United States. It is estimated that up to 20% are leaking at any point in time because of deteriorated, faulty, or improperly seated flappers. Some studies show that the average leaking toilet wastes 100 gallons per day or more, suggesting a total nationwide daily waste of over 5 billion gallons, or nearly 2 trillion gallons per year. This problem is not limited to the United States. Unpressurized tank-based toilets that use flappers are common around the world as are other toilet designs that can leak.

On the shelves of hardware stores and do-it-yourself home supply centers, you can find up to a dozen different types of replacement flappers, many touted as being "universal", to address this very common problem of preventing leaks. Water utilities often acknowledge that the number-one reason for high water bills to home owners is due to leaking toilet flappers. When customer service representatives of these water utilities receive a call about a high water bill, it is common for them to send out dye packs or food coloring for the customer to put inside the toilet tank. If the flapper is leaking, the dye or food coloring should be visible in the toilet bowl after a short period of time. This is a simple and effective way to detect leaky flappers, but often much water has been wasted (with corresponding cost or well run dry) by the time the problem is discovered and diagnosed.

Not surprisingly, there have been many previous attempts at devices that will automatically detect leaking toilet flappers. Yet, very few of these have ever resulted in successfully commercialized products. Most are not practical, too complicated for the average home owner to install, or too expensive. Some require the entire toilet to be replumbed. Others require replacement of internal toilet components. Still others don't provide helpful feedback to the user. Just as there are those who will not change or add oil in their cars until the red "OIL" light illuminates on their dashboards, some people will not replace or fix their toilet flapper unless there is something that indicates the desirability to do so. When it comes to simple routine maintenance, many of us benefit from being advised what to do and when to do it.

There is thus a long felt but unsolved need for an effective and non-invasive way to automatically detect leakage or other unintended operation of a flush toilet and provide an alert to prompt the user to take corrective action.

Exemplary illustrative non-limiting implementations herein provide a device for in use being vibrationally coupled to a toilet tank of the type having a fill valve therein that automatically refills the toilet tank. The exemplary illustrative non-limiting implementation comprising an enclosure that in use conducts translational vibrations produced by toilet fill valve refilling. The enclosure is dimensioned and configured to define a resonant cavity which in use supports sympathetic resonant vibrations excited by the conducted translational vibrations. A transducer disposed within the enclosure and vibrationally coupled to the resonant cavity produces a signal responsive to the conducted translational vibrations and the sympathetic resonant vibrations.

The enclosure may be configured to self-stick on the outside of the toilet tank, and may include an adhering structure disposed on the enclosure, the adhering structure in use being removably adherable to a flush toilet porcelain outer toilet tank surface.

The adhering structure may comprise foam-based double sided adhesive tape.

The enclosure may include first and second enclosure portions, at least one of the portions including a groove that mates with a lip provided by the other of the first and second enclosure portions to provide a substantially water-resistant seal therebetween.

An electronic circuit board may be disposed between the first and second enclosure portions, the first enclosure portion providing plural rib structures that press the electronic circuit board into the second enclosure portion and thereby tightly vibrationally couple the printed circuit board to vibration generated by the toilet due to refill turbulence, the transducer being mounted to the circuit board.

The resonant cavity may be dimensioned to resonate at an acoustic frequency that is at or near a frequency the transducer is responsive to.

The exemplary illustrative non-limiting implementation may be self-contained to detect water leaking from the toilet tank without contact to any flowing liquid.

The exemplary illustrative non-limiting implementation may define a slot from which a battery pull tab protrudes, the slot opening into the resonant cavity.

The exemplary illustrative non-limiting implementation may be no more than 8 mm in its longest dimension.

The exemplary illustrative non-limiting implementation can be adhered or otherwise attached to the outside or inside surface of a flush toilet, in order to electronically monitor a toilet and provide visual and/or audible notification when the toilet is leaking.

The exemplary illustrative non-limiting implementation may electronically monitor the sound, vibration and/or noise generated by a toilet during its operation and provide an alert such as a visual and/or audible notification to inform a user or other entity when there is a leak.

Exemplary illustrative non-limiting installation includes attaching The exemplary illustrative non-limiting implementation by use of adhesive to the inside or outside surface of the tank, or by use of a flexible hinge or hanger, or manually snapping as an assembly onto the fill valve cap, or mechanically coupled to any water line feeding the toilet or toilets to be monitored, or other methods.

A further exemplary illustrative non-limiting device for use with a tank and flapper-based toilet can integrated with an additional attaching structure for manual attachment to the fill valve cap. A support mechanism supported by an attaching structure can act to conditionally interfere with the operation of the toilet tank fill valve assembly to prevent overflows and/or water waste in response to leak detection. See commonly assigned U.S. patent application Ser. No. 12/036,629 filed Feb. 25, 2008 (now U.S. Pat. No. 7,757,708 issued Jul. 20, 2010) entitled "Toilet Bowl Overflow Prevention and Water Conservation System and Method" incorporated herein by reference.

A desirable design objective for the exemplary non-limiting implementation is simplicity of installation and use. Achieving that objective without any user setup or calibration can be accomplished by unique sensor and electromechanical technology that allows the product to be placed on virtually any tank and flapper based or other toilet (there are hundreds of different models), accounting for dozens of different types of fill valves, flappers, and variations in water pressure (even on the same toilet), while simultaneously ignoring or being less sensitive to external noise, incidental bathroom disturbances and all kinds of interference.

Additional features and advantages of non-limiting exemplary illustrative implementations include:

Environmentally friendly—protects the environment by conserving water and eliminating water waste Low cost Easy to deploy Attending to leaks can save money Installs in seconds—No tools required Fully Automatic—No set up necessary Works on any toilet Visual and/or audible alerts Small, sleek design High sensitivity—detects even leaks you cannot see or hear Detects vibration, sound and/or noise the toilet generates during operation (e.g., from turbulence when fill valve open)

Detects leakage based on water inflow using non-contacting sensing techniques

Able to effectively detect even intermittent leaks

Same transducer can be shared between sensing and annunciating operations, thereby saving cost No user input required—fully automatic operation Easy Peel/Place/Pull installation Directly acousto-mechanically coupled to toilet Non-contact—no need to contact water or interfere with water inflow or outflow No plumbing required Non-invasive: no modification of toilet or toilet components required Senses wide spectrum noise generated by water turbulence within the toilet Can use an inexpensive rugged low power sensor such as a piezo-electric vibration sensor Can provide status when toilet is flushed Can provide status periodically to inform user that unit is operating Display can be complex or simple; some implementations display detailed information, other implementations provide simple status display such as Green (unit functioning properly), Red (toilet is leaking and requires attention), Yellow (battery low)

Leak indication can be provided periodically (e.g., every 20 seconds) when a leak has recently been detected (e.g., within the last 24 hours) and/or after user-initiated or other flushes Leak indication can be provided with less frequency if leak has been detected but not so recently (e.g., audible indication approximately every three hours if a leak has not been corrected within 72 hours after detection)

Can be located outside, inside or within toilet tank or other structure

Can be installed on a toilet in the field or at time of manufacture

Other

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
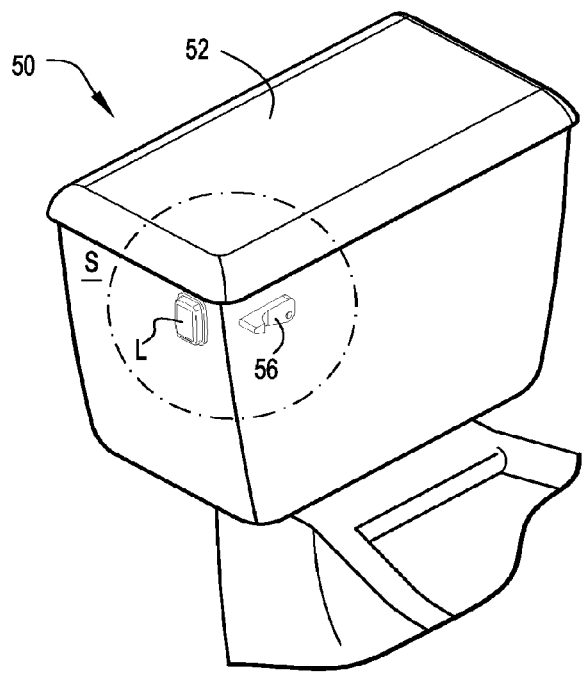
FIG. 1 is an upper-corner front-facing view of a toilet and one example mounting location for an exemplary illustrative non-limiting Device L.
Figure 1A:
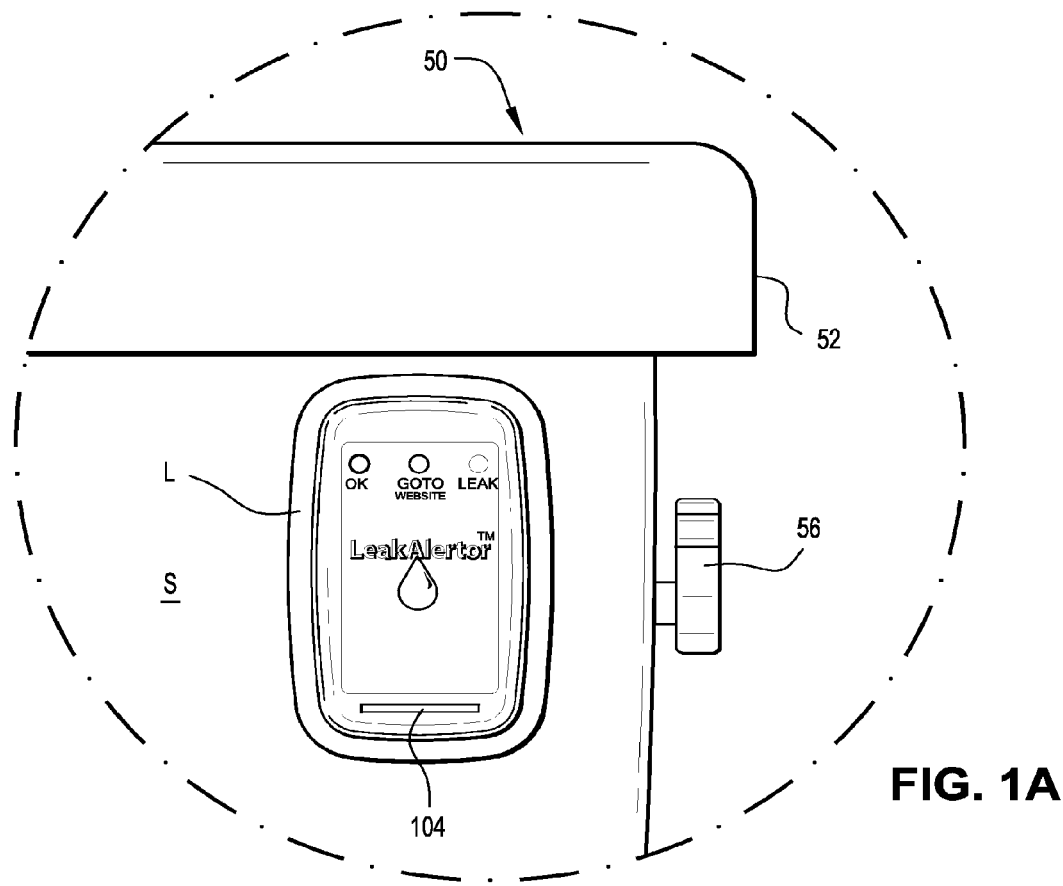
FIG. 1A shows the top of a toilet tank and one example mounting location for the exemplary illustrative non-limiting Device L.

FIGS. 1 and 1A show an exemplary illustrative non-limiting implementation that can be used to detect leakage or waste of water due to unintended fill operations of a flush toilet 50 or other fluid handling device. As will be explained below, a self-stick leak detector device L can be removably adhered to the outside surface of toilet tank 52. Once installed, device L is closely coupled to the toilet tank 52's surface such that vibrational energy transmitted by/through the porcelain or other material comprising toilet tank 52 is mechanically and vibrationally coupled to the device. Such vibrational energy can be detected and used to ascertain whether water flow through the toilet 50 is intended or unintended.

In more detail, opening of the toilet 50's fill valve 66 (see FIG. 6) causes water to rush into the toilet tank 52, generating water turbulence that induces noise and vibration in the material comprising the porcelain or other shell comprising toilet tank 52. The device L defines a resonant cavity therein. The cavity's resonant frequency lies within the noise spectral band of vibrations induced in the toilet tank 52 by operation of the toilet's fill valve 66. Therefore, vibration energy transmitted through the toilet tank 52 excites resonant oscillations within the resonant cavity. These resonant oscillations can build in intensity during the fill valve 66's operation. Such resonant oscillations allow a vibration transducer(s) or pickup disposed within the device L vibrationally coupled to the resonant cavity to more reliably convert toilet tank vibration into responsive electrical or other signals that can be analyzed and used to generate an alert.

Figure 8A:
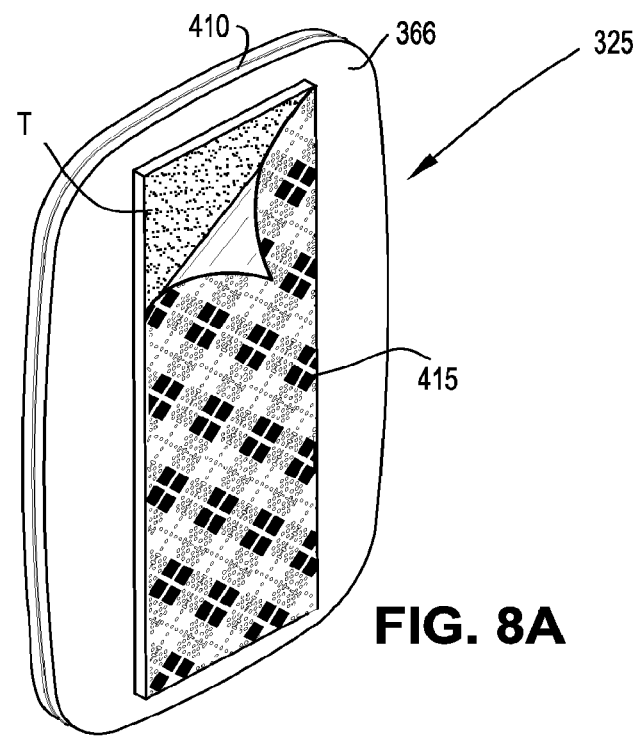
FIG. 8A shows the adhesive strip attached to the rear plate of an exemplary illustrative non-limiting Device L.
Figure 8B:
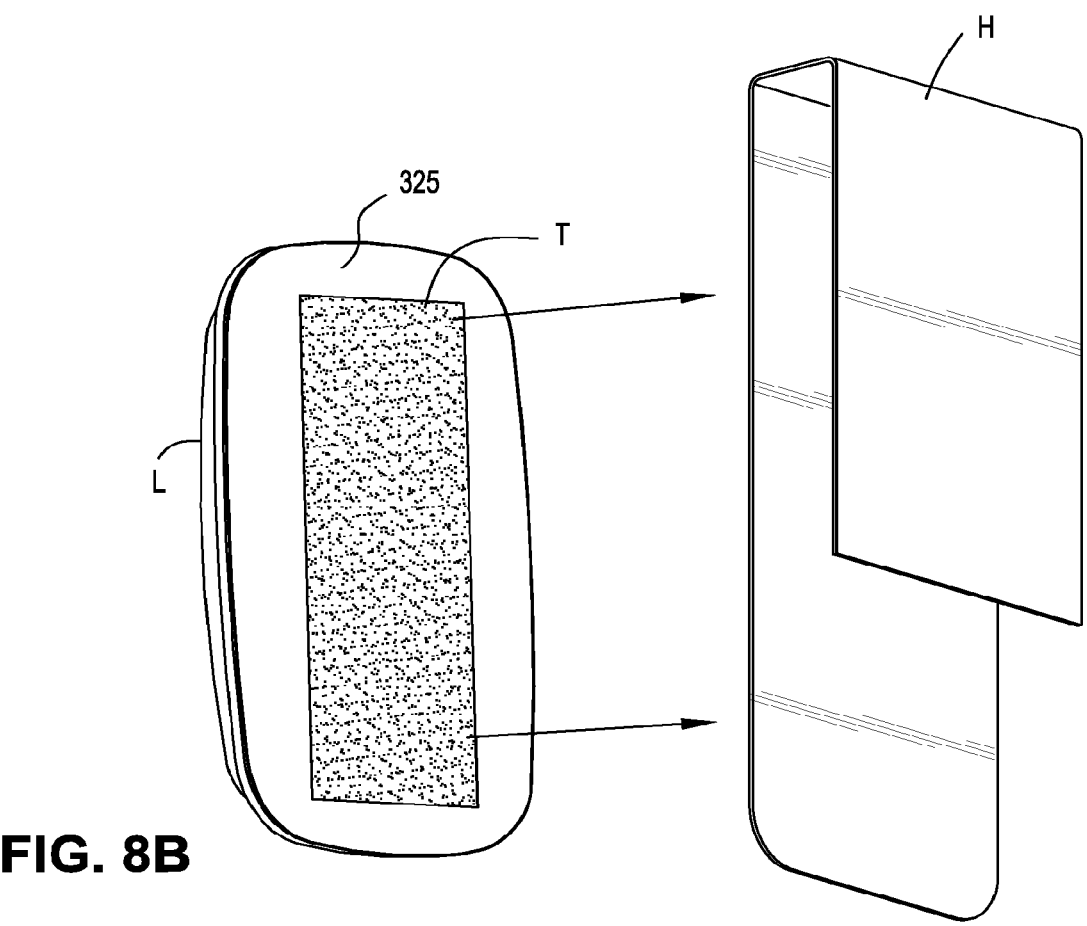
FIG. 8B shows an exploded view of the exemplary illustrative non-limiting Device L attached to a hanger H.
Figure 9:
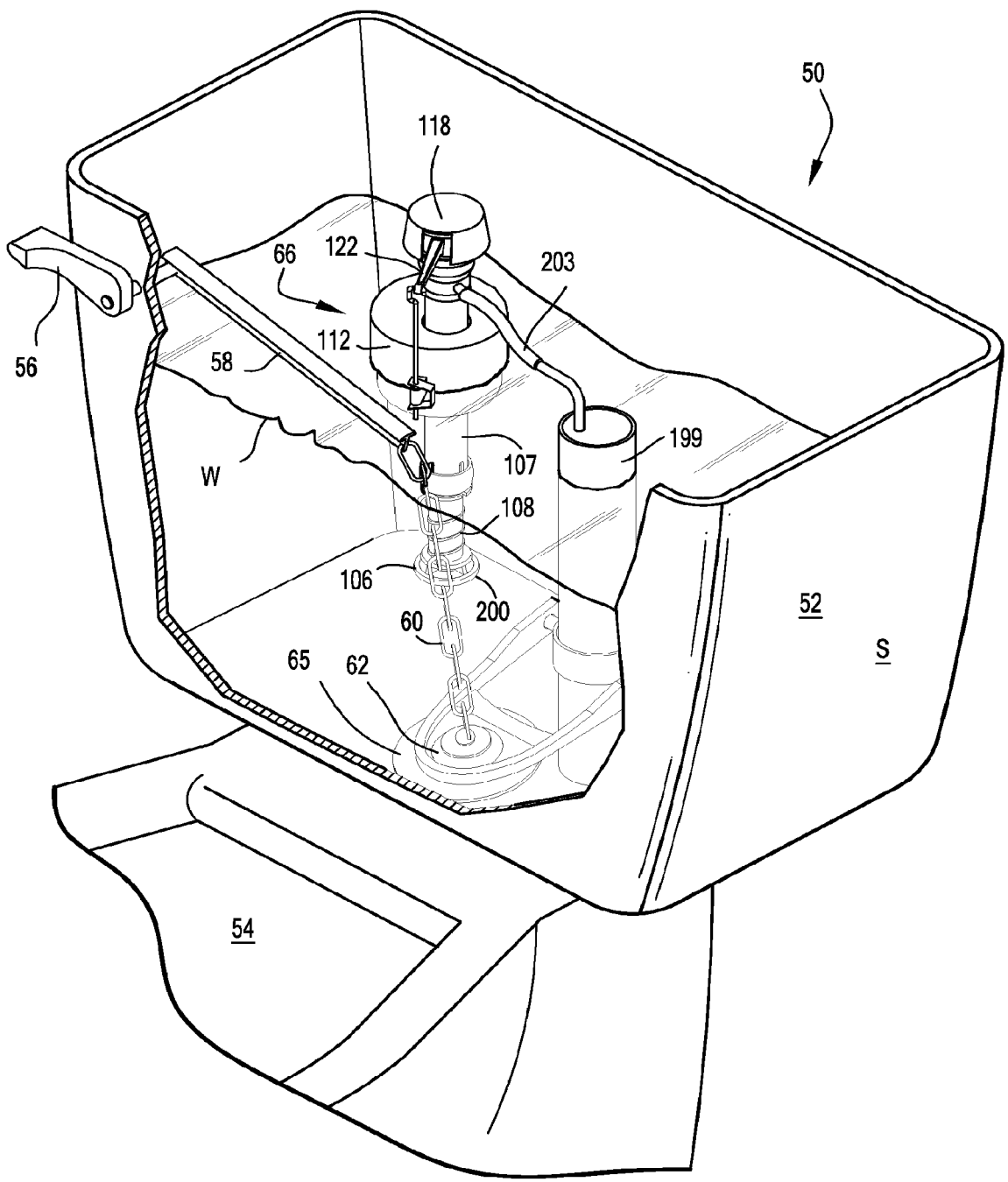
FIG. 9 is a cutaway view of an example illustrative conventional toilet prior art toilet tank.
Figure 10:
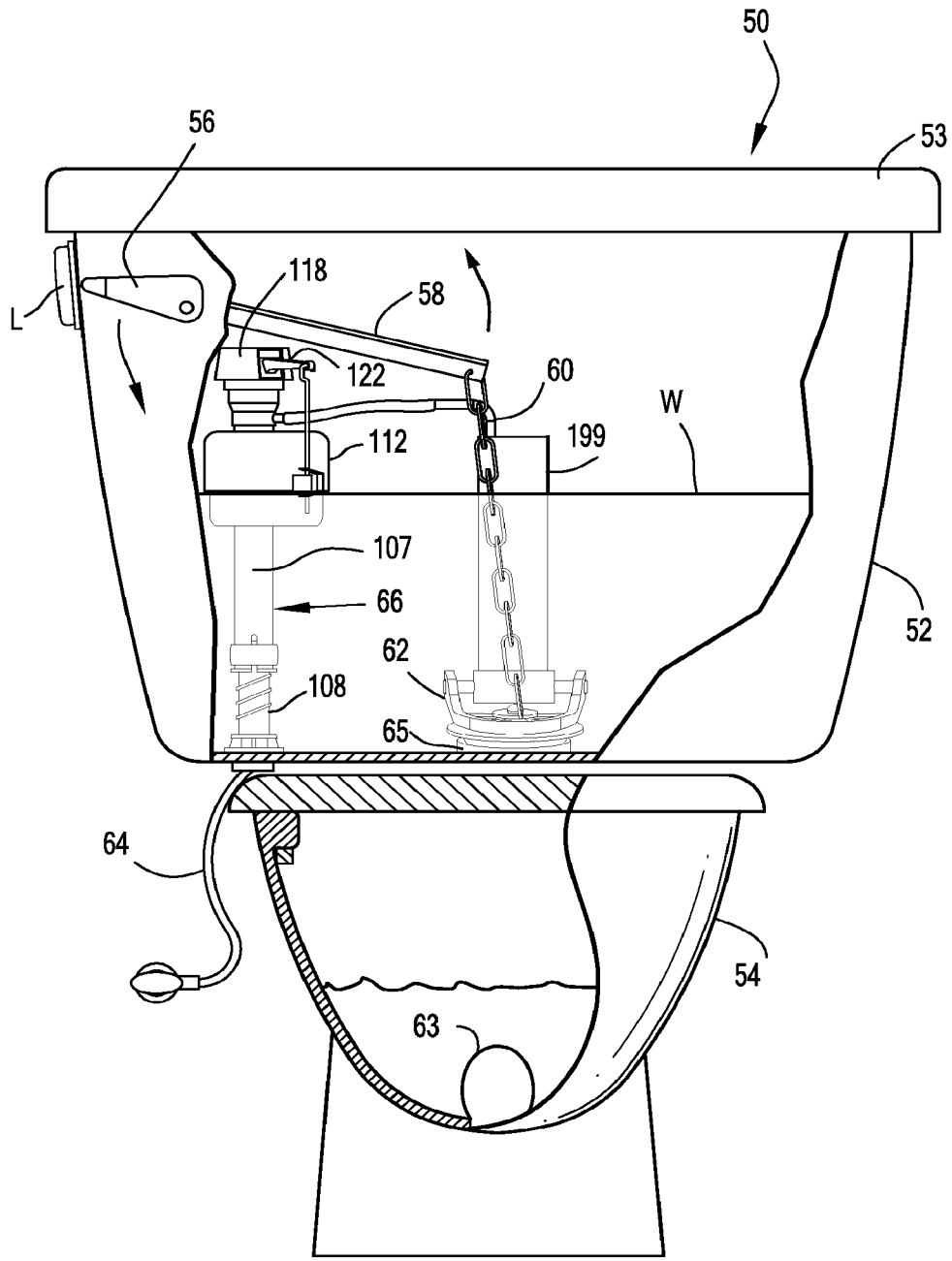
FIG. 10 is a cutaway view of an example toilet during a user-intended flush operation wherein the user presses the flush handle to initiate a flush.
Figure 11:
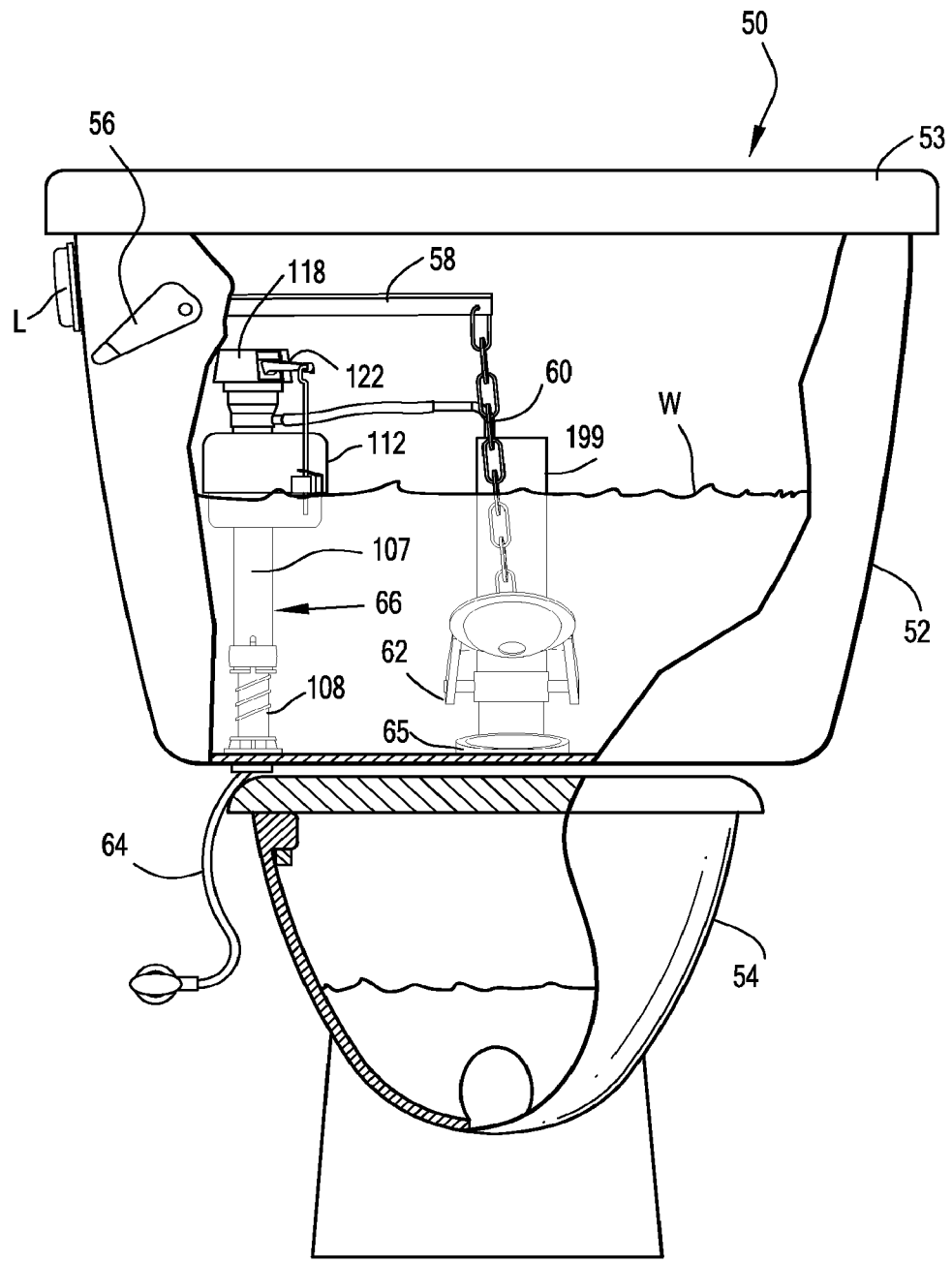
FIG. 11 shows the FIG. 10 toilet after the flapper has been opened and water is flowing from the tank into the bowl to evacuate the bowl.

Device L in the exemplary illustrative non-limiting implementation can be removably adhered to an outside smooth porcelain surface S of a toilet 50. Toilet 50 can be any type of conventional toilet including but not limited to a conventional flush type toilet including flapper 62 and fill valve 66 as shown in FIG. 9. Device L can be placed anywhere desired on or off the toilet 50 such that it is acoustically or vibrationally coupled to the toilet, e.g., through direct contact, through the air, through other structures, etc. However, in one example implementation, the device L is adhered directly to the porcelain surface S on the outside of a tank 52 of toilet 50. Device L can in one exemplary illustrative non-limiting implementation be configured as a self-stick device that can be stuck to the smooth porcelain surface of the tank 52. In other exemplary non-limiting implementations, a separately applied adhesive compound or structure can be used to adhere the device to the outside surface S of the tank 52. In one exemplary illustrative non-limiting implementation, a double side foam based tape T (See FIGS. 5 and 8A) is used to adhere device L to the outside of tank 52.

Figure 2:
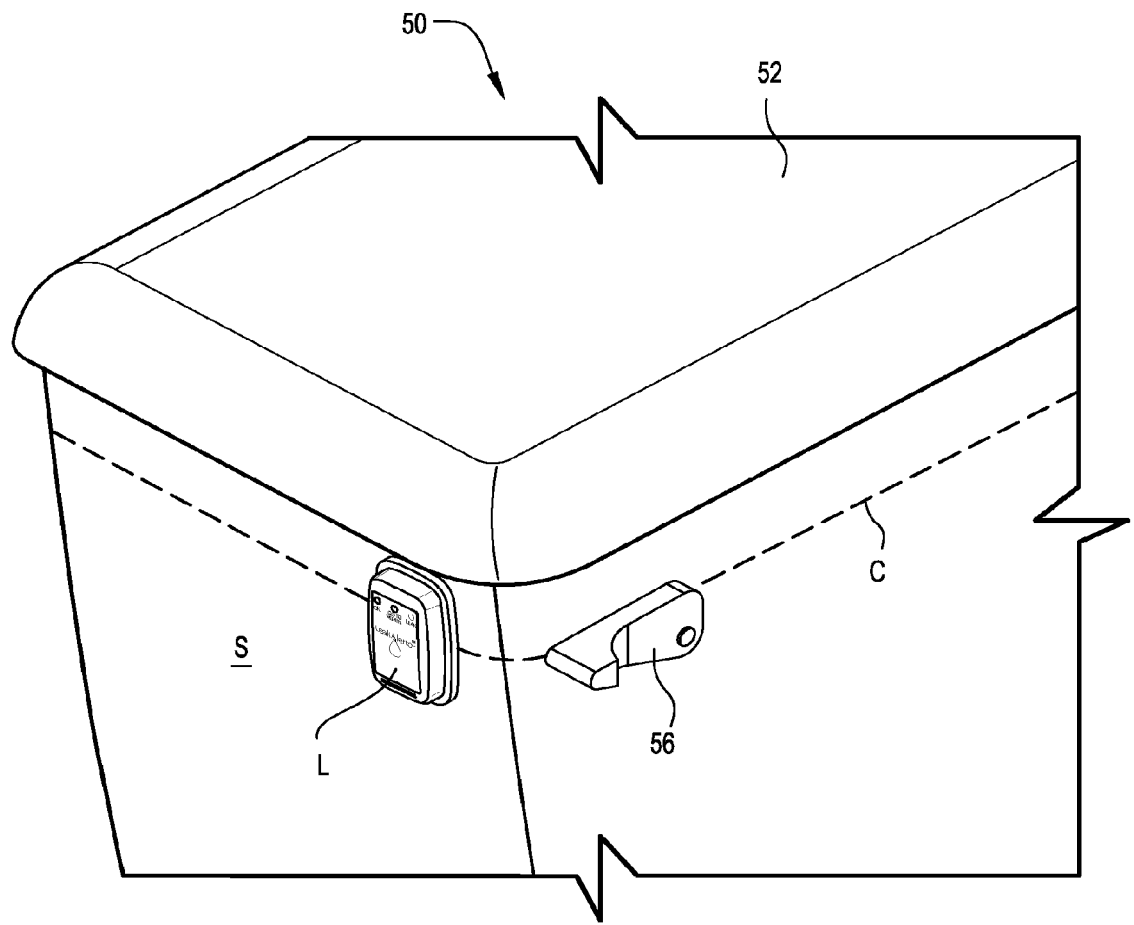
FIG. 2 shows an exemplary illustrative view of an example mounting location for the illustrative Device L along an example circumference of a toilet tank.

In one exemplary illustrative non-limiting implementation, the device L is optimally mounted on a particular circumference C a few inches below the top of the toilet tank 52 (see FIG. 2). In the exemplary illustrative non-limiting implementation, there is no need to couple the device L directly or indirectly to the flush handle 56 nor is there any need for the device L to be in contact with water or other fluid within or outside of the tank 52. Rather, the exemplary illustrative non-limiting device L is self-contained and non-contacting in the sense that it is not in contact with either the water inflow or outflow of the toilet. It is also not in mechanical engagement with the toilet flush handle 56. In one exemplary illustrative non-limiting implementation, device L can be mounted in any convenient manner and in any physical position so that it is directly or indirectly able to receive acoustic and/or vibrational energy the toilet 50 generates.

Figure 3A:
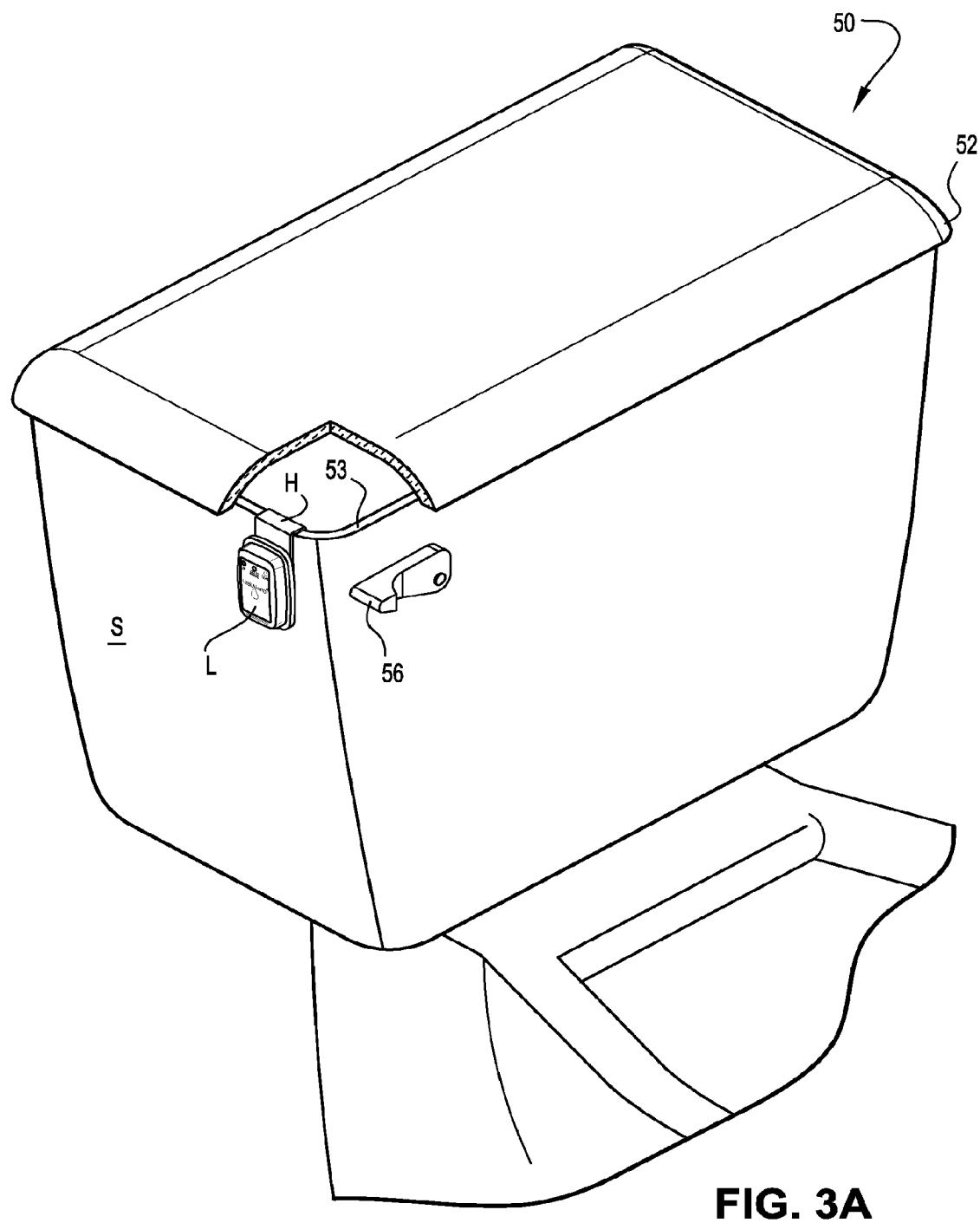
FIG. 3A is a cutaway view of an example conventional prior art toilet tank with the exemplary illustrative non-limiting Device L attached in an alternative way by means for example of a hanger placed outside the toilet tank as one possible location.
Figure 3B:
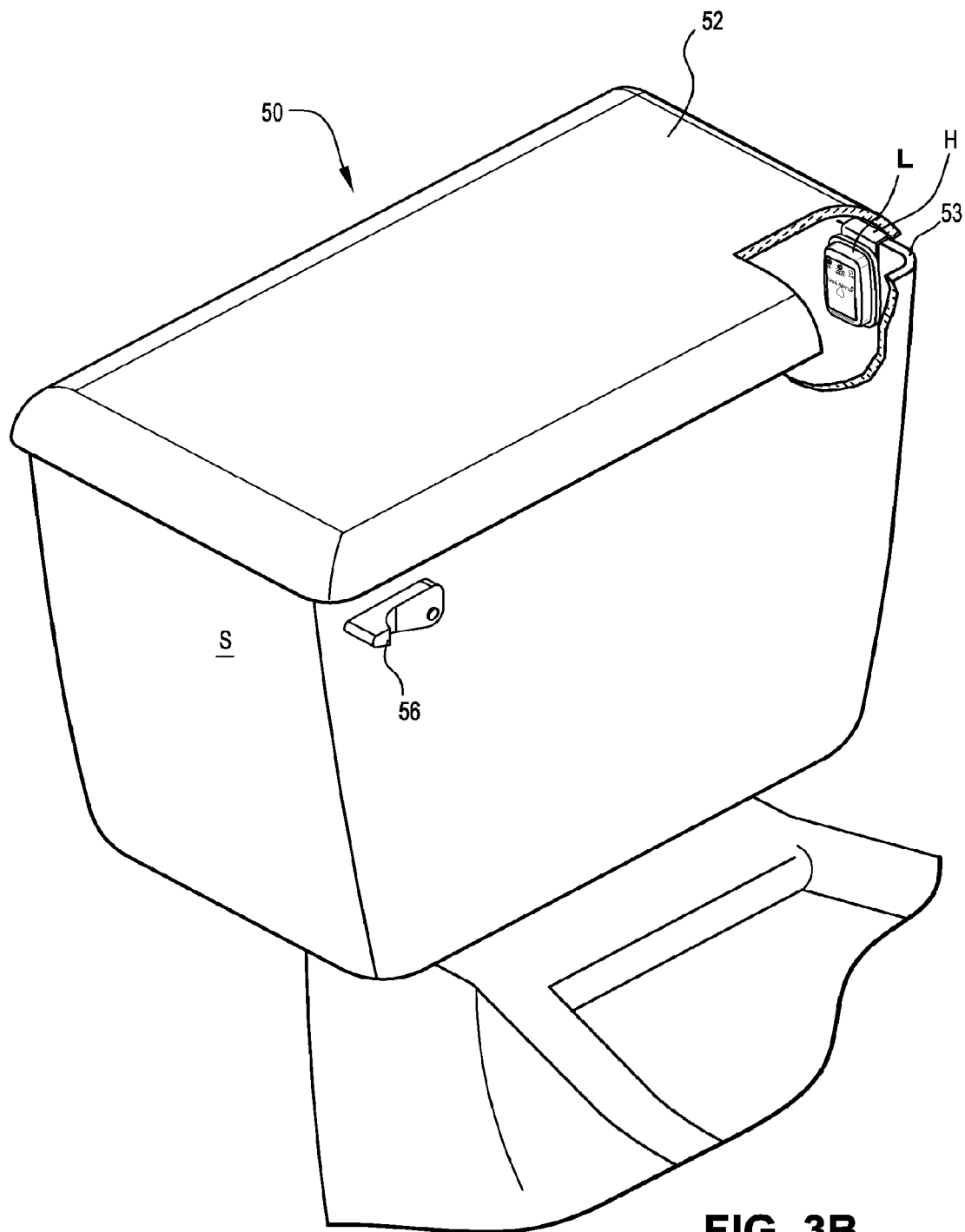
FIG. 3B is a cutaway view of an example conventional prior art toilet tank with the exemplary illustrative non-limiting Device L attached in an alternative way by means of a hanger placed inside the toilet tank as one possible location.

Thus, the device L can be mounted on the side, front or back of the tank 52 (FIG. 1A), on the top of the tank, underneath the tank, within the tank (see FIG. 3B), on the bowl, on the wall near the toilet 50, or anywhere where it can sense noise and/or vibration the toilet generates. The device L can be attached to the toilet 50 with adhesive tape, hung to the tank using a metal bracket H (see FIGS. 3A, 3B), placed on the top of the tank, or placed or mounted anywhere else as may be desired. FIGS. 3A and 3B show a hanger H that can be bent over the top lip 53 of tank 52. Mounting examples shown are in solid or other contact with tank 52 surface S, allowing for translational vibration and/or noise to be directly transmitted to the device, but other mounting positions that are not in direct contact with the toilet are also possible and may be desirable in some applications.

Most toilets 50 are exposed to condensation, harsh cleaning agents, and the occasional errant toddler who needs to work on his aim. Except for a downward facing and angled slot for a battery activation tab (to be described below), the exemplary illustrative non-limiting unit has been sealed to be waterproof or water-resistant and thus to fully protect it from liquid and cleaning agents. The slot can be eliminated in some applications to provide a completely hermetically sealed waterproof sealed design.

Example User Installation and Operating Procedure

Figure 4:
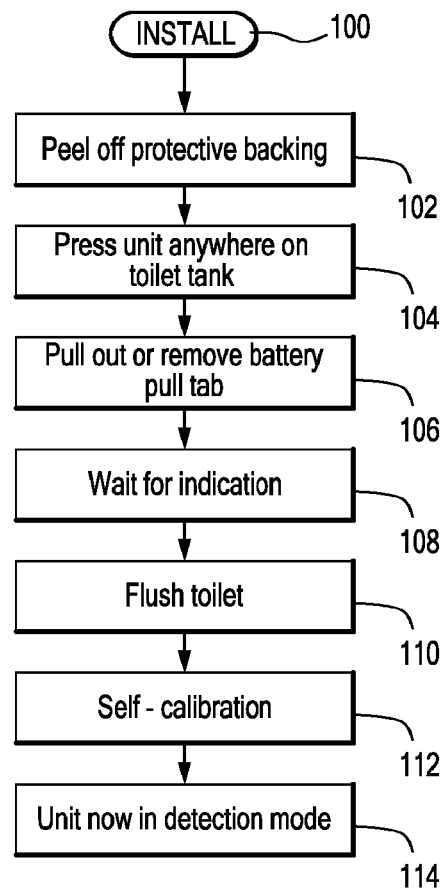
FIG. 4 is a flowchart representing an example method of installing the exemplary illustrative non-limiting Device L.

FIG. 4 shows an exemplary illustrative non-limiting installation procedure for installing Device L on a toilet 50. To install the device L (FIG. 4 block 100), the user peels a protective backing 415 off of double-backed adhesive tape T (block 102; see FIGS. 5 and 8A) and presses the unit anywhere on the toilet tank (block 104). The user then pulls out and/or removes a battery pull tab (not shown; block 106) and waits for the device L to provide an indication (block 108). Once an aural and visual indication is provided, the user flushes the toilet (block 110). The device L self-calibrates by recording characteristics of the toilet flush and subsequent refill operation (block 112). When self-calibration is completed, the device L is now in the detection mode and is ready to detect leaks.

Figure 4A:
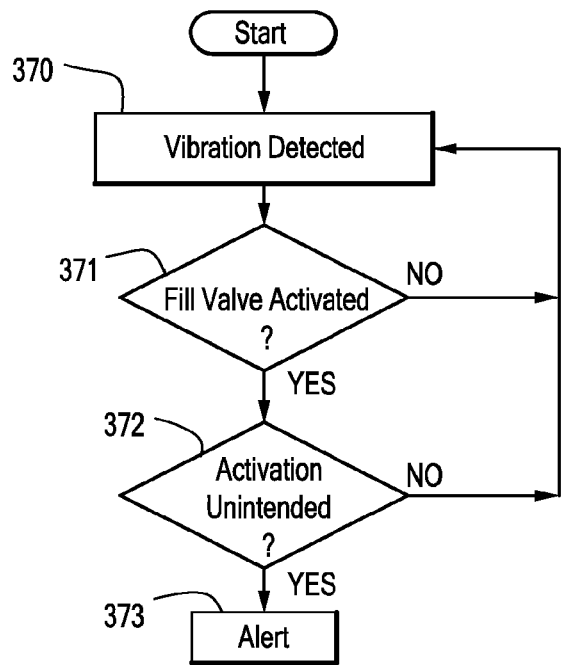
FIG. 4A is a flowchart representing an example method by which the exemplary illustrative non-limiting Device L recognizes a leak and generates an alert.

A simple flow chart that summarizes how device L can determine the difference between an intended and unintended fill valve 66 action is shown in FIG. 4A. When the device L detects vibration (block 370), decision block 371 determines if said vibration is related to the action of fill valve 66 (see FIG. 9) of the toilet 50. If it is not related to fill valve 66, the process loops back to the vibration detection 370 until it once again detects vibration. If the vibration detected is due to a fill valve 66 action, then decision block 372 determines if the fill valve 66 action was intentional or unintentional. If intentional, it is understood that toilet 50 has been purposefully flushed. If unintentional, alert 373 is activated, making it known to a user or other person that a leak of some kind is taking or has taken place. Leak detection may thus use a=detecting means and/or algorithm to determine (a) if vibration has been or is occurring; (b) if the vibration detected is due to a fill valve 66 action; and (c) if that action is either intended or unintended, the latter indicating a leak of some kind. In order to perform that function, the leak detector L may take into account a plurality of factors in order to correctly ascertain the source of any detected vibration and the correct analysis of the same. In one exemplary illustrative non-limiting example, periodical cyclical operations of the fill valve 66 are indirectly detected through sensing of noise and/or vibration caused by water turbulence, and such detection is used to trigger alert 373.

FIGS. 5, 6A, 6B, and 7 show the exemplary non-limiting device L as being a mechanically compressed, or solid-coupled device, that has been designed to transfer the vibrational and/or acoustic response of the toilet fill valve 66 action at a significant enough amplitude or volume level so as to be easily detected inside, outside, on, or near the toilet tank 52.

Figure 5:
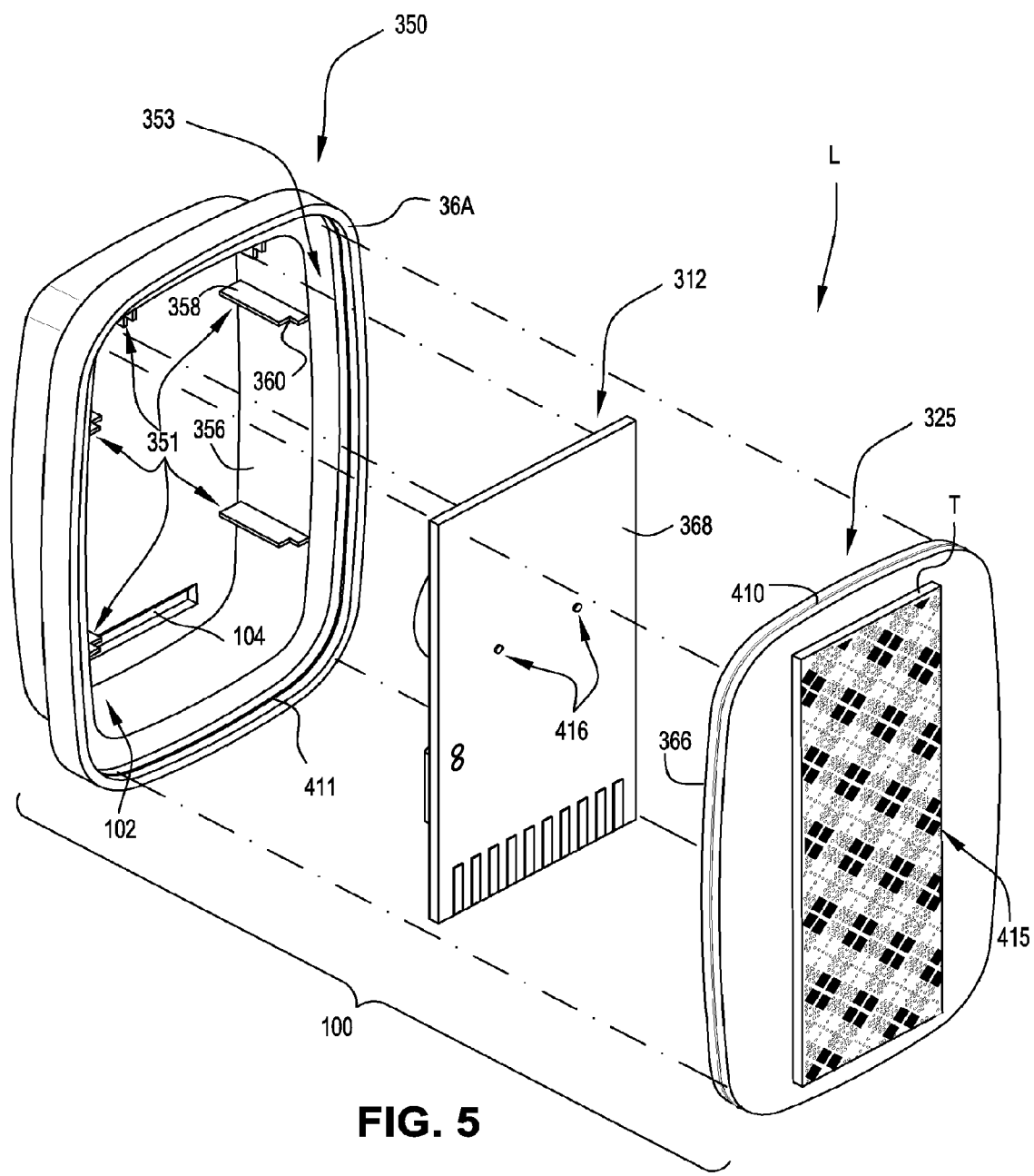
FIG. 5 shows a disassembled rear exploded view of one possible non-limiting mechanical deployment of the exemplary illustrative non-limiting Device L.

FIG. 5 shows a disassembled exploded view of one possible mechanical deployment of the exemplary illustrative non-limiting device L. The device L includes a housing 100 that when assembled (see FIG. 1A) may have dimensions of for example 70 mm long by 45 mm wide by 15 mm high. Thus, the exemplary illustrative non-limiting implementation of device L has no extent that exceeds 80 or 100 mm, although other implementations are possible.

Device L in one exemplary illustrative non-limiting implementation comprises an enclosure top 350 and an enclosure base plate 325. The enclosure top 350 and enclosure base plate 325 can each be made of molded plastic or any other type of suitable material.

In the exemplary illustrative non-limiting implementation of device L, the top enclosure portion 350 forms an inner cavity 102 therein. A plurality of ribs or fingers 351 are defined in a circumferential side wall 356. Each of these ribs or fingers 351 includes a longitudinal portion 358 terminating in an L-shaped end portion 360. A printed circuit board 312 is press-fit into enclosure top 350, resting on the L-shaped end portions 360 of ribs or fingers 351 defined within a cavity 102 formed within the enclosure top. Fingers 351 force the proper alignment, or mechanical registration, of printed circuit board 312 with the remainder of the enclosure top 350.

Figure 6B:
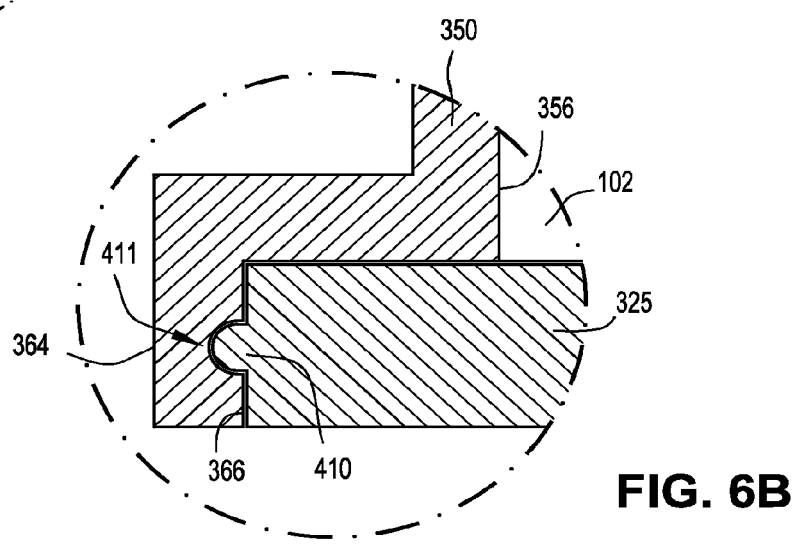
FIG. 6B shows a close-up view of the FIG. 6A exemplary illustrative non-limiting enclosure base as it mates to the enclosure top, detailing the mating rib on the enclosure base that snaps into the receiving cavity on the enclosure top.
Figure 7:
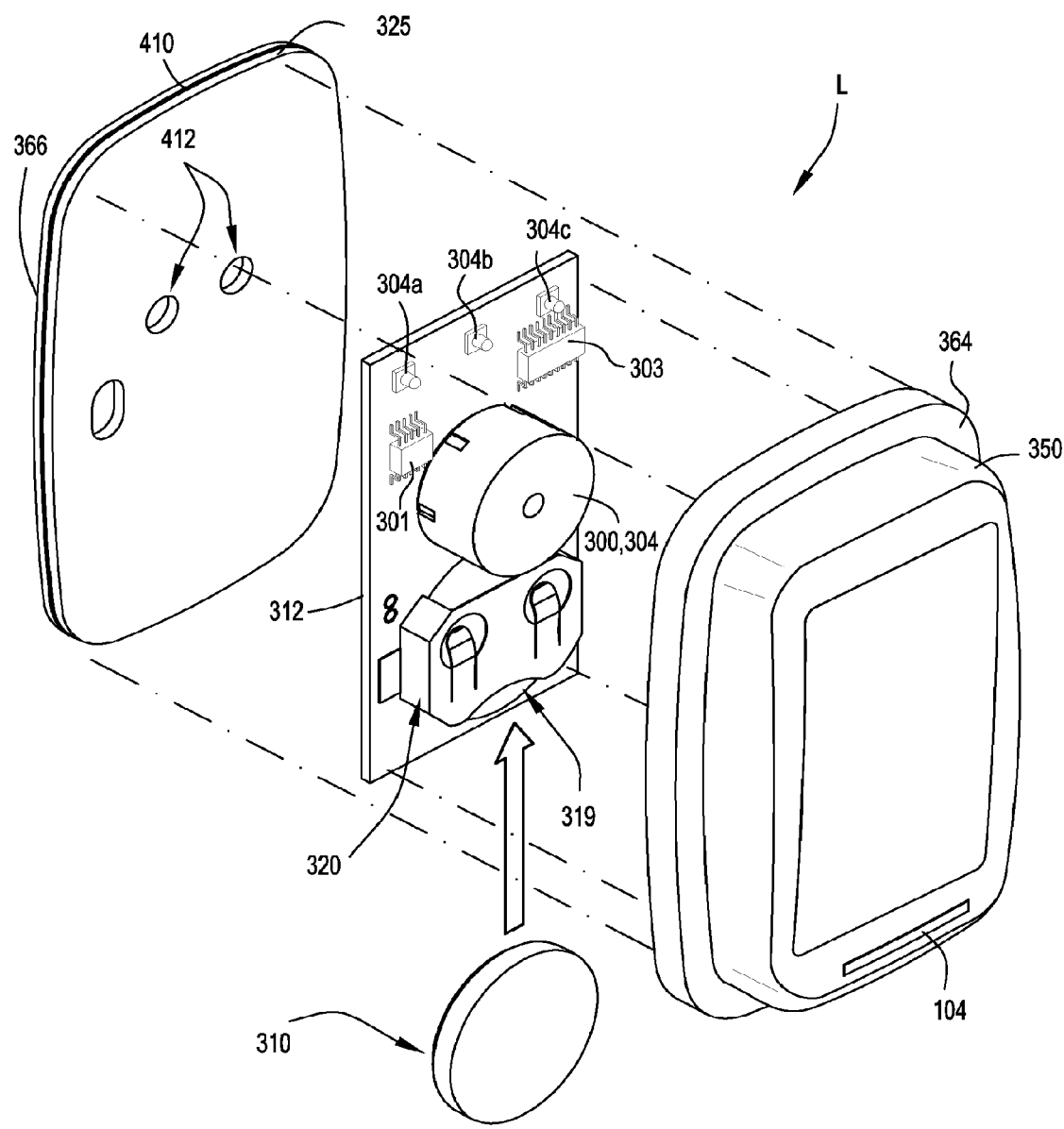
FIG. 7 shows a dissembled front exploded view of one possible non-limiting mechanical deployment of the exemplary illustrative non-limiting Device L detailing a printed circuit board providing the mechanical and electrical relationship of the battery, battery holder, and piezo sensor and annunciator.

FIG. 7 shows the same structure with a component side 362 of printed circuit board 312 facing towards enclosure top 350. Mounted on printed circuit board 312's component side 362 are various components including light emitting diode indicators (LEDs) 304a, 304b, and 304c, and a piezo sensor/annunciator 300. In the exemplary illustrative non-limiting implementation, these components face outward into cavity 102. Enclosure base plate 325 snaps into enclosure top 350, compressing printed circuit board 312 between the base and top rib ends 360 to result in a very snug fit. FIG. 6B shows a protruding semi-round ridge or lip 410 that extends circumferentially around the edge 366 of enclosure base plate 325. This ridge or lip 410 snaps into a mating semi-round groove 411 defined in an overhanging corner 364 extending circumferentially around enclosure top 350. The snapping of ridge or lip 410 into groove 411 seals cavity 102, making the device L waterproof or water-resistant and also preventing vibrational energy wavefronts excited within cavity 102 from escaping. In some implementations, the two enclosure portions 350, 325 are sealed at the factory to provide a waterproof hermetic seal.

In the exemplary illustrative non-limiting implementation, enclosure base 325 has holes 412 (see FIG. 7) that allow the solder joints 416 of piezoelectric transducer 300 to protrude beneath the inside surface of enclosure base 325, preventing obstruction so that non-component side 368 of printed circuit board 312 is flush to enclosure base 325. A battery pull tab slot 104 can be provided in enclosure top 350 to allow a battery pull tab (not shown) to protrude from the device L during shipment and before installation. Pulling the tab out through slot 104 can allow an internal battery 310 to make contact with the remaining circuitry, thereby powering the device L.

The unit is very lightweight so it can be adhered to a porcelain toilet surface with common adhesive such as double-backed tape. FIG. 5 shows a strip of double-backed tape 415 with one side adhered to enclosure base 325, and the other side ready to have its protective backing removed so that it can be attached on toilet 50 or possibly on a nearby wall. It should be noted that double-backed tape 415 may not be needed in some instances, with device L simply placed on top of or near toilet 50, without being adhered to it.

Figure 6A:
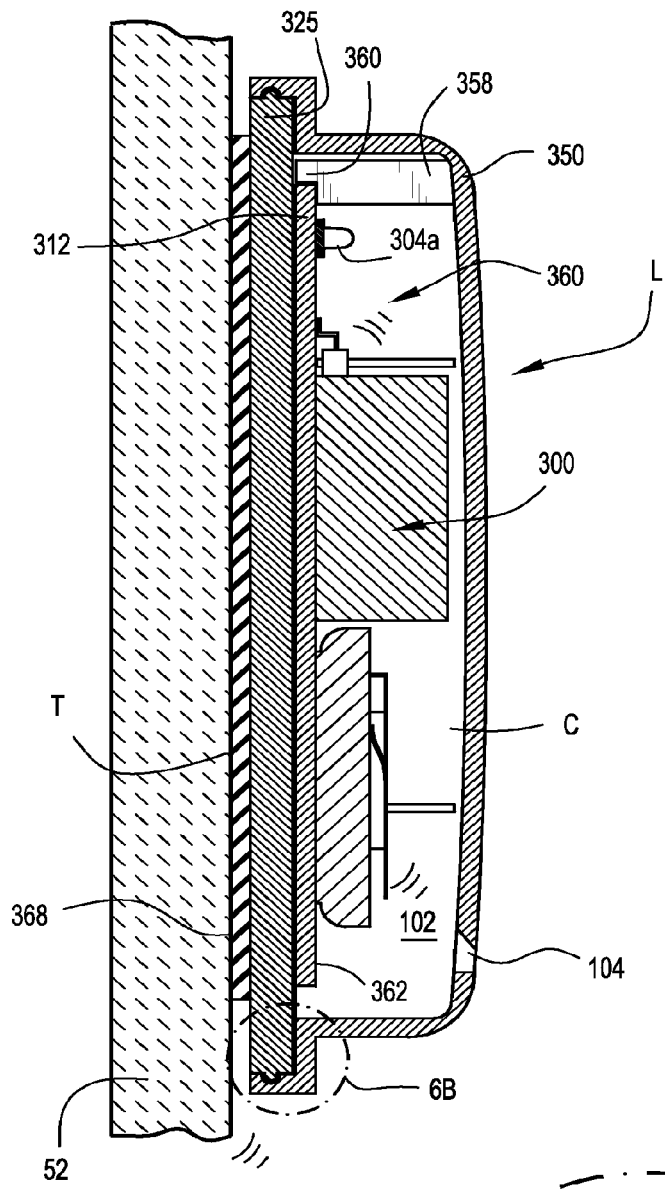
FIG. 6A shows a cutaway side view of an exemplary illustrative non-limiting Device L detailing the mechanical configuration of a vibration-sensitive assembly that includes a printed circuit board, battery, piezo sensor and annunciator, and protective containment housing.
Figure 12:
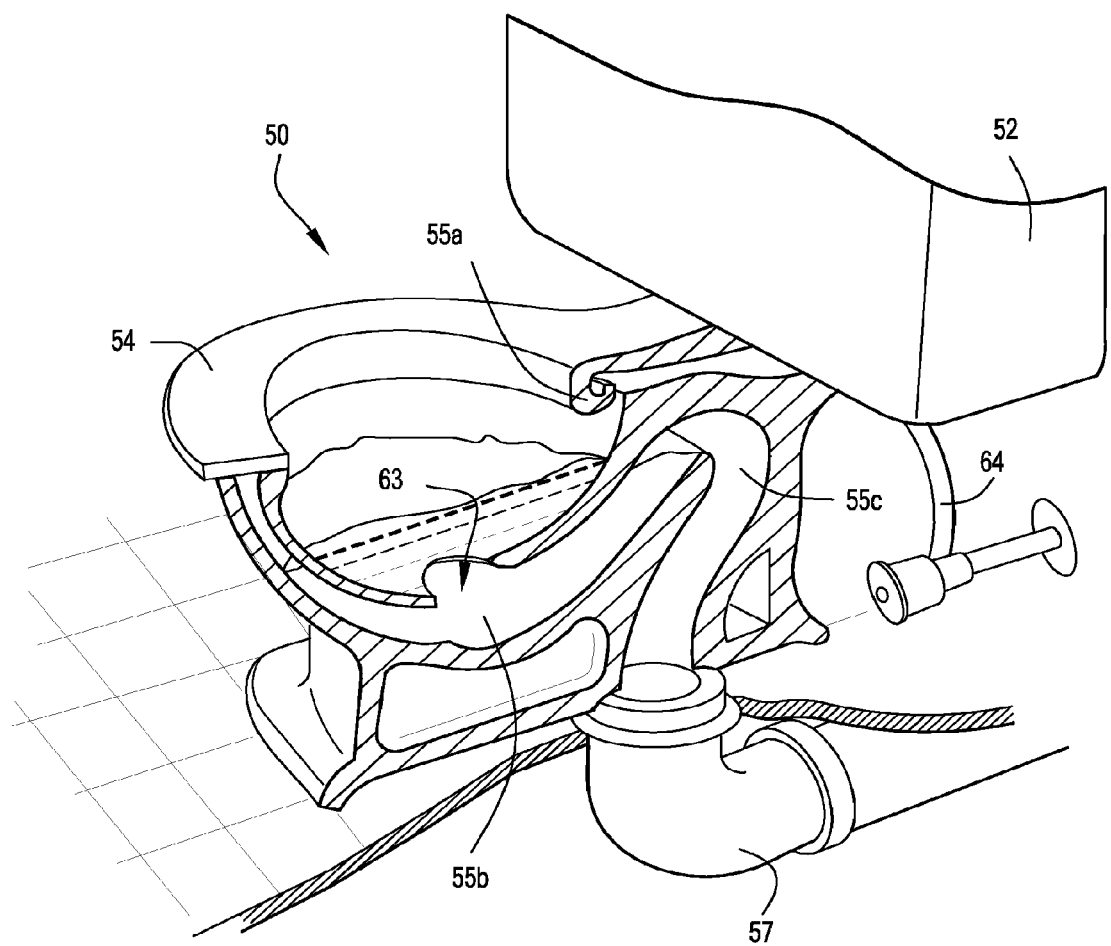
FIG. 12 shows the conventional toilet as the bowl is being evacuated by water flowing from the tank into the bowl.

FIG. 6A shows a cross-section of the fully assembled exemplary non-limiting device L, whereby the resulting physical response of printed circuit board 312 attached piezo 300 is highly sensitive to the vibration and sound produced as a result of fill valve 66 action. To better illustrate this, FIGS. 9-15B show an example modern conventional toilet 50 comprising a tank 52 of the type device L can be vibrationally coupled to, and a bowl 54. The tank 52 holds a quantity of water W. Pulling on flush handle 56 causes lever 58 to lift chain 60, which in turn raises flapper 62 at the bottom of tank 52. Flapper 62 is a kind of valve that flaps open (up) and closed (down). When chain 60 raises flapper 62 off of the flush valve seat 65 (see FIGS. 10 and 11), water W from the tank 52 rushes downward through an opening into the bowl 54. This inrush of water flows through rim holes 55a and siphon hole 55b (see FIG. 12). This water inrush increases the water pressure within the bowl, forcing water through exhaust port 63 and past vapor trap 55c beneath the bowl and down into waste pipe 57. This flow of water and waste into the waste pipe 57 creates a strong siphon that evacuates the bowl through exhaust port 63, producing the characteristic flushing "whoosh" sound familiar to most people. In most toilets, the bowl 54 is molded so that the water enters the rim, and some of it drains out through rim holes 55a. In many modern toilets, a good portion of the water flows down to a larger siphon hole 55b at the bottom of the bowl as shown in FIG. 12. This hole is known as the siphon jet. It releases most of the water directly into the siphon tube. Because all of the water in the bowl enters the tank in a very short time (e.g., three to five seconds), it is enough to fill and produce the siphon effect, and all of the water and waste in the bowl is sucked out into waste pipe 57.

Figure 13:
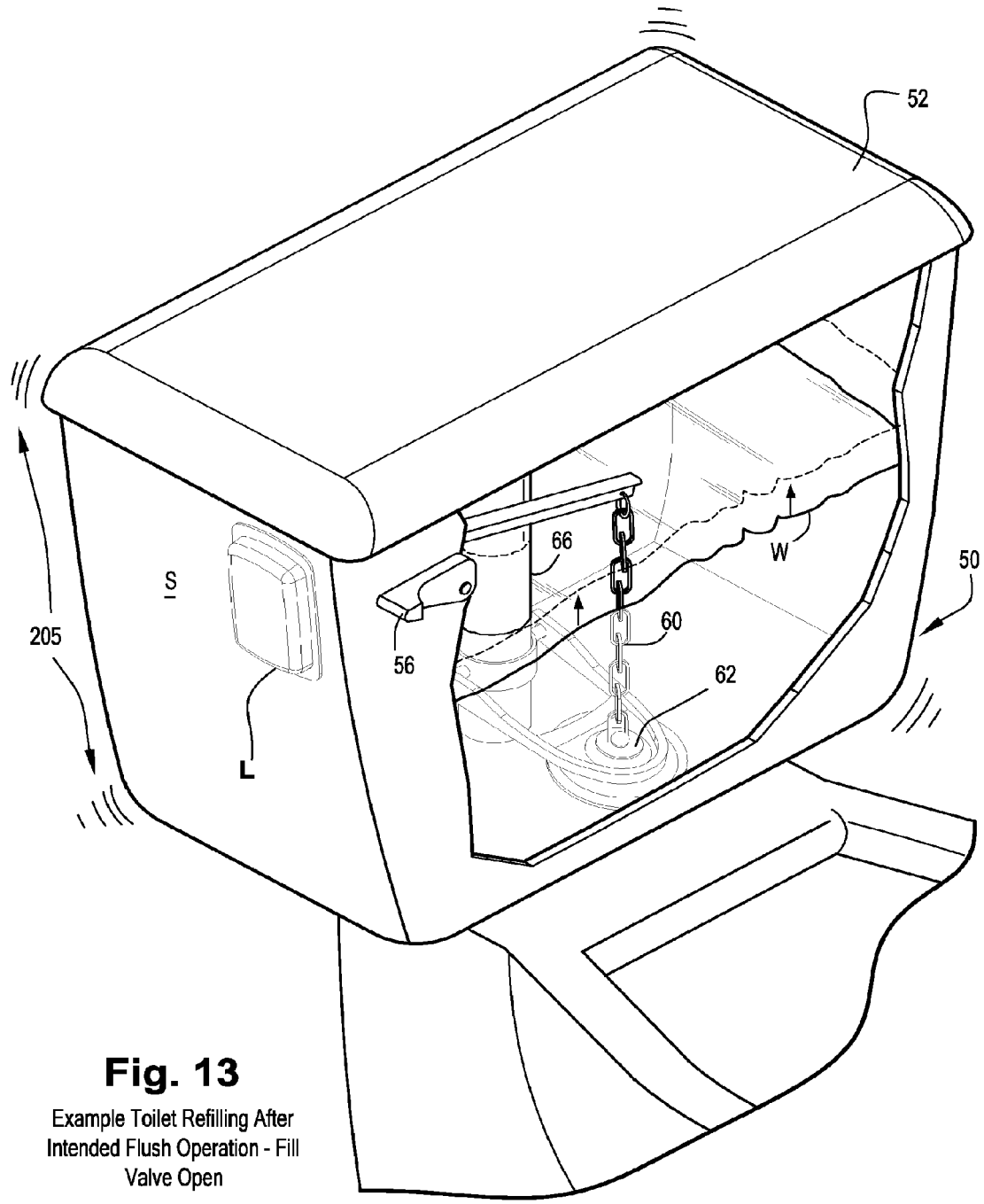
FIG. 13 is a cutaway front-facing view of an example toilet after an intended flush operation, with the tank refilling through the fill valve after the flapper has returned to its down and sealed position.

When nearly all of the water has escaped from the tank 52, the flapper 62 descends back down to its original position as shown in FIG. 10, once again sealing the water passage between the tank and the bowl 54 (see FIG. 13). Fresh tap water flowing into the tank 52 through a fill valve 66 from an inlet pipe 64 begins to fill the tank. Turbulence or water entering the tank causes the tank to vibrate and water can be heard running into the tank. A float 112 rises with the rising water level. When the float 112 reaches a preset level, the fill valve 66 closes automatically in response and water ceases to flow into the tank 52. The toilet 50 is now quiet and is ready for another flush (see FIG. 10), having now operated properly with respect to water flow. Notice that the proper operation of fill valve 66, as described above, should only occur when a flush is initiated, or purposefully intended, by the movement of flush handle 56, which causes the entire flush cycle to commence and repeat.

Fill valve 66 operation generally operates in the following manner. As previously explained and illustrated in FIGS. 10 & 11, fill valve 66 fills tank 52 with water when float 112 falls below a predetermined level water height 81 (which is usually between ¼ and ¾ inch below water height 80) and terminates the flow of water when float 112 rises back to water height 80. A properly functioning fill valve 66 will only allow water flow when float 112 falls below the aforementioned predetermined height.

Figure 14:
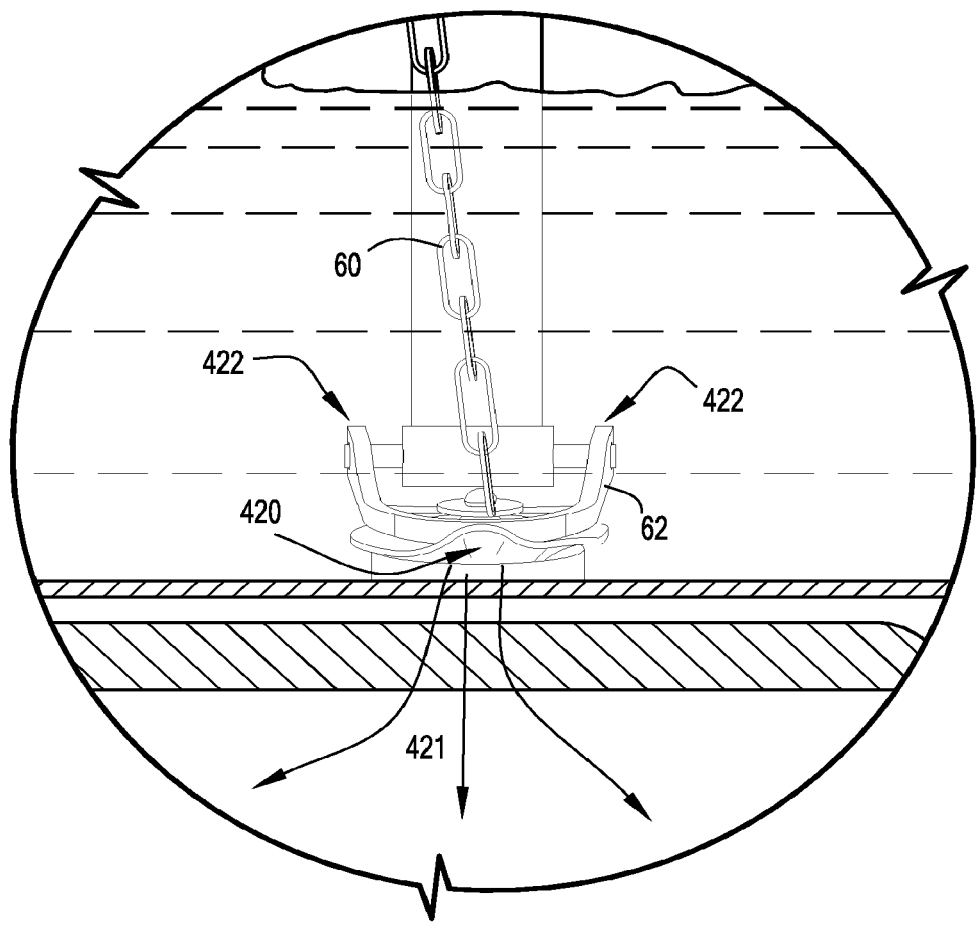
FIG. 14 is a close-up internal view of a toilet tank leaking due to a defective flapper.
Figure 15A:
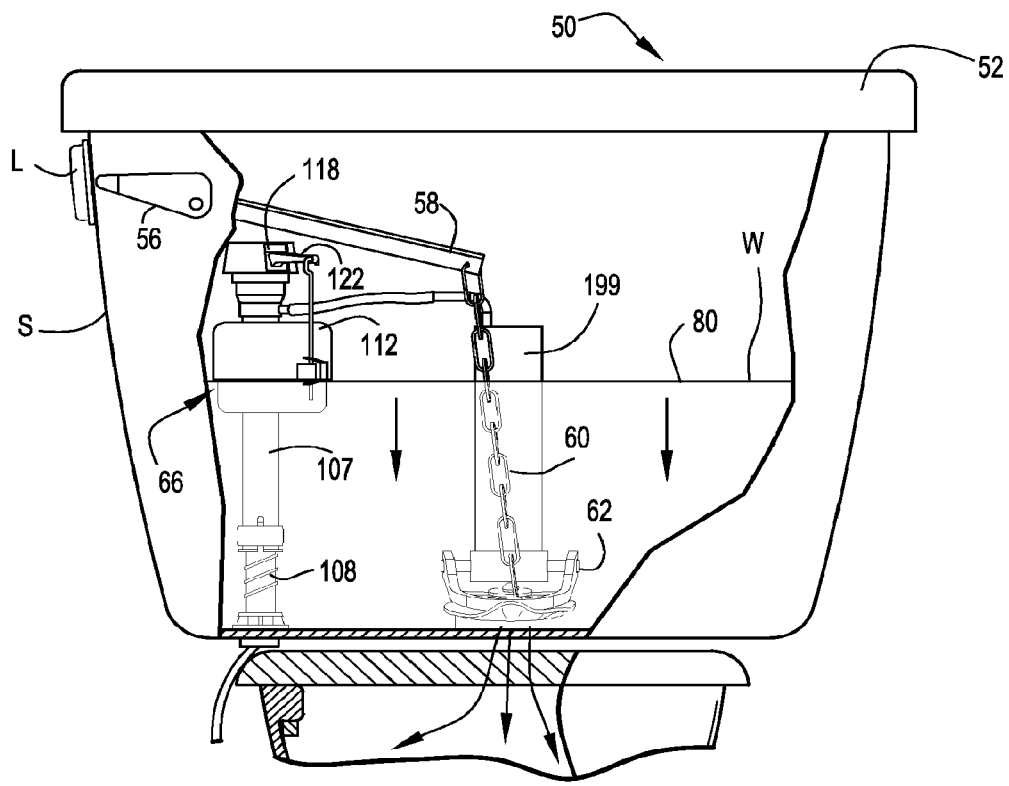
FIG. 15A is a cutaway view of an example toilet tank as water height falls due to leakage through a defective flapper.
Figure 15B:
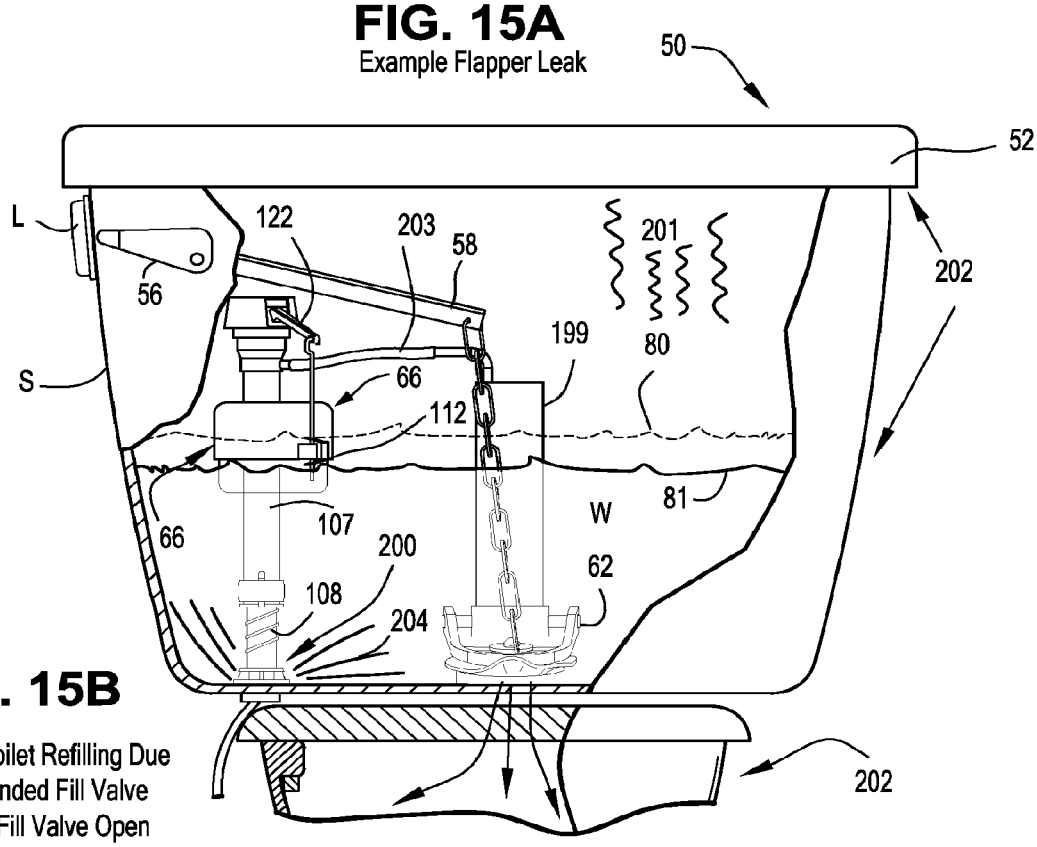
FIG. 15B is a cutaway view of an example toilet tank refilling through the fill valve after sufficient water has leaked out through the defective flapper to cause a refill to begin.

An intended fill valve 66 action is simply flushing toilet 50, the normal operation of which has been previously described. During the flush, the fill valve 66 opens and allows water to flow until flapper 62 has closed and float 112 has risen to the level of water height 80. The total time duration of this fill valve 66 action is the amount of time it takes to first evacuate tank 52 into bowl 54, at which point flapper 62 closes, plus the amount of time it takes to refill tank 52 with water W to water height 80. The primary factors determining this time duration are generally the volume of water in tank 52 prior to the flush being initiated, the size opening of the evacuation port beneath flapper 62 and the volume of water over time that is able to flow through it while flapper 62 is open, and the water pressure and flow rate applied through inlet pipe 64 that flows through fill valve 66, which are factors in refilling tank 52 back to water height 80 after flapper 62 has closed. If the flapper 62 is leaking or is not properly sealed (as shown in FIG. 14), the toilet 50 can periodically cycle between drain and refill cycles (FIGS. 15A, 15B) without any user operating flush handle 56. Such unintended operation causes fill valve 66 to periodically fill the tank 52 which then drains through the leaking flapper 62, which causes the fill valve to refill the tank, etc. A leak can be detected and an alert generated if device L can (a) detect the operation of fill valve 66 and (b) distinguish between intended and unintended operation of the fill valve. See FIG. 4A.

Whether intended or unintended, fill valve 66 actions that permit water flow thus generally result in some level of vibration and audible noise (or sound) that is conducted into and through tank 52. See FIG. 13. When fill valve 66 opens to allow water flow, the water flows out of base port 200 located at the bottom of the fill valve 66 just above the inside bottom of tank 52 as shown in FIG. 9, and also through refill hose 203 into overflow tube 199, which evacuates into bowl 54. The water flow through the entire body of fill valve 66 and by base port 200, under pressure from inlet pipe 64, produces water turbulence 204 and causes water and tank vibration 205 (FIG. 9), and also produces water collisions against the side and bottom of tank 52, resulting in noise within and around tank 52. The simultaneous water flow through refill hose 203 into overflow tube 199 produces additional vibration and audible noise.

Whether flapper 62 remains open, allowing water to evacuate into bowl 54, or whether it is closed, causing water W to rise, the combined vibration and audible noise produced can be detected by the leak detector L shown in FIG. 1. This mechanical vibration and/or sound can be detected by a variety of different kinds of well-known devices, such as microphones and piezoelectric sensors although the exemplary illustrative non-limiting implementation uses a piezoelectric pickup 300 because of its ruggedness and low cost. Measurement of tank vibration 205 and/or the sound with a sensor with a wide broadband response shows a frequency distribution from below 200 hertz to well above 10 kilohertz, with frequency distribution and power bandwidths that change from toilet to toilet due to variations in water pressure, tank volume and acoustics, fill valves, overflow tubes, and virtually all of the factors that affect the turbulence and resulting noise due to the flow of water within the toilet itself. Basically, every toilet exhibits a unique vibration and/or noise signature, and no two are exactly alike. However, because this sound is generally broadband wide spectrum (white) noise, it can be detected by even a narrow-band transducer 300 so long as the transducer has a responsivity that falls within the spectrum of the white noise.

As shown in FIG. 6A, the exemplary illustrative non-limiting device L when adhered to the porcelain surface of tank 52 provide a translational vibration mechanical coupling between the tank 52 through the foam substrate of tape T, the plastic base plate 325, the printed circuit board 312 to the piezoelectric transducer 300. Thus, any vibration of toilet tank 52 will be transmitted through the foam tape T, the base plate 325 and the printed circuit board 312 (which is pressed firmly into contact with the base plate) to the transducer 300. In addition, such transmitted vibration will be coupled to resonant cavity 102 formed between the top and bottom enclosures 325, 350. This resonant cavity 102 supports oscillations at a characteristic frequency that falls within the frequency band of the wide spectrum noise generated by most toilets when the fill valve 66 is open. Such oscillations excite the air within resonant cavity 102 to resonate, providing a resonance power spectrum that results in transducer 300 being subjected to increased vibrational energy. In the exemplary illustrative non-limiting implementation, the resonant cavity 102 is tuned so that its resonant frequency is at or near the relatively narrow response bandwidth of transducer 300. In this way, transducer 300 receives vibration produced by the sympathetic (parastic) resonance of resonant cavity 102 as well as translational vibration conducted through structures T, 325 and 312, and generates an increased electrical response to the vibration produced by water turbulence caused by operation of fill valve 66. Resonant cavity 102 thus provides increased signal-to-noise ratio of electrical signals transducer 300 generates in response to vibration from toilet 50. Resonant cavity 102 may also provide some degree of rejection to noise sources that are not close to its resonant frequency.

Although one purpose of exemplary non-limiting device L is to identify fill valve 66 actions, it will also detect other nearby sounds and vibrations related and unrelated to fill valve 66 actions. Exemplary ways to distinguishing between intended fill valve actions, non-intended fill valve actions, and random environmental noise are described in the copending commonly-assigned US patent application referenced above and incorporated herein by reference.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A water-resistant or water-proof device for in use being vibrationally coupled to a toilet tank of the type having at least one wall defining therein a water-holding cavity containing a fill valve that automatically refills the toilet tank, turbulence or water entering the tank cavity resulting in wide spectrum noise within and around the tank causing the tank to produce vibrations, the water-resistant or water-proof device comprising:

a water-resistant or water-proof enclosure structured to be acoustically coupled to the toilet tank, the enclosure in use conducting translational vibrations produced by the toilet tank, the enclosure being dimensioned and configured to define a resonant cavity therein that is acoustically coupled to the toilet tank and separated by the toilet tank wall from the toilet tank cavity, the resonant cavity defined by the enclosure in use supporting sympathetic resonant vibrations excited by the conducted translational vibrations, the resonant cavity supporting oscillations at a characteristic frequency that falls within the frequency band of the wide spectrum noise generated within and around the toilet tank, the oscillations-exciting air within the resonant cavity to resonate and provide a resonance power spectrum; and a transducer disposed within the enclosure and vibrationally coupled to the resonant cavity, the resonance power spectrum resulting in the transducer being subjected to vibrational energy enhanced by said resonance, the transducer having a response bandwidth, the transducer producing a signal responsive to the conducted translational vibrations and the sympathetic resonant vibrations, wherein the resonant cavity is tuned so that its resonant frequency is at or near the response bandwidth of the transducer to provide increased signal-to-noise ratio of the signal produced by the transducer in response to said toilet tank vibrations.

2. The device of claim 1 wherein the enclosure is configured to self-stick on the outside of the toilet tank.

3. The device of claim 1 further including an adhering structure disposed on the enclosure, the adhering structure in use being removably adherable to a flush toilet porcelain outer toilet tank surface.

4. The device of claim 3 wherein the adhering structure comprises foam-based double sided adhesive tape.

5. The device of claim 1 wherein the enclosure includes first and second enclosure portions, at least one of the portions including a groove that mates with a lip provided by the other of the first and second enclosure portions to provide a substantially water-resistant seal therebetween.

6. The device of claim 5 further including an electronic circuit board disposed between the first and second enclosure portions, the first enclosure portion providing plural rib structures that press the electronic circuit board into the second enclosure portion and thereby tightly vibrationally couple the printed circuit board to vibration generated by the toilet tank due to refill turbulence, the transducer being mounted to the circuit board.

7. The device of claim 1 wherein the resonant cavity is dimensioned to resonate at an acoustic frequency that is at or near a response frequency of the transducer.

8. The device of claim 1 wherein the device is self-contained to detect water leaking from the toilet tank without contact to any flowing liquid within the tank.

9. A water-resistant or water-proof device for placement on the outside of a toilet tank of the type having at least one wall defining a water-holding cavity including a fill valve therein, turbulence or water entering the tank cavity resulting in wide spectrum noise within and around the tank causing the tank to produce vibrations, the device comprising:

a transducer arrangement in use producing an electrical response to vibrations and/or sound produced by water turbulence caused by operation of the toilet fill valve; and a water-resistant or water-proof enclosure enclosing the transducer, the water-resistant or water-proof enclosure defining a resonant cavity therein, the enclosure in use being adherable to the outside of the toilet tank, the toilet tank wall isolating the enclosure from the cavity within the tank, the enclosure being dimensioned and configured such that the resonant cavity formed therein in use supports sympathetic resonant vibrations excited by vibration produced by water turbulence caused by the operation of the toilet fill valve and is structured to in use conduct translational vibration from the toilet tank to the transducer, the resonant cavity supporting oscillations at a characteristic frequency that falls within the frequency band of the wide spectrum noise generated within and around the toilet tank, the oscillations exciting air within the resonant cavity to resonate and provide a resonance power spectrum resulting in the transducer being subjected to vibrational energy enhanced by said resonance, wherein the resonant cavity is tuned so that its resonant frequency is at or near the response bandwidth of the transducer to provide increased signal-to-noise ratio of the signal produced by the transducer in response to said toilet tank vibrations.

10. The device of claim 9 wherein the enclosure is self-stickable to an outside smooth surface of the toilet tank without providing any coupling to the cavity within the tank.

11. The device of claim 9 wherein the transducer arrangement is coupled to an alert arrangement that provides an audible and/or visual indication that a leak has been detected.

* * * * *